Oct. 12, 1926.  
J. F. WEBB, JR  
TRAIN STOPPING SYSTEM  
Filed Feb. 26, 1925  
1,602,513  
15 Sheets—Sheet 6
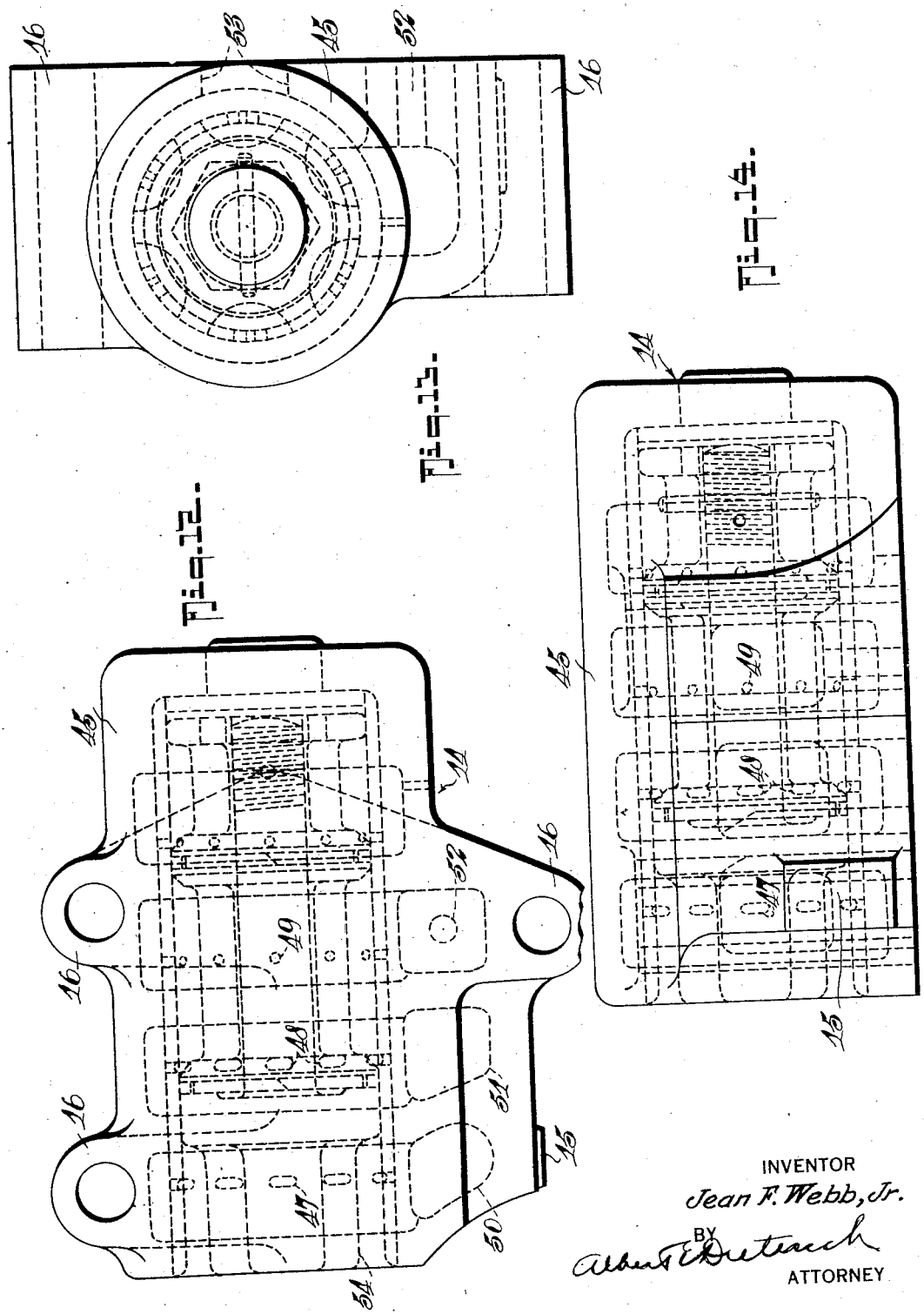
INVENTOR  
Jean F. Webb, Jr.  
BY  
ATTORNEY

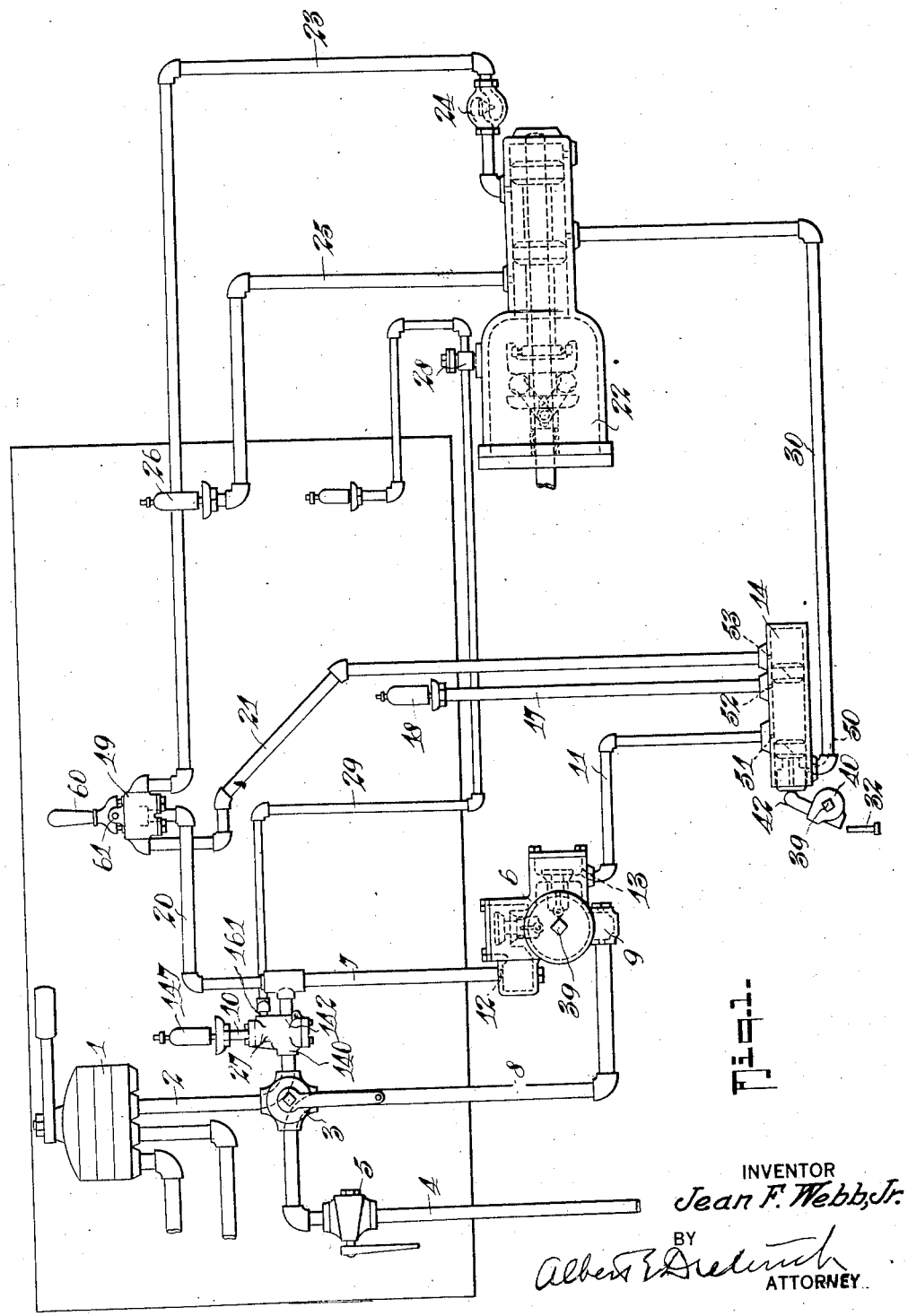

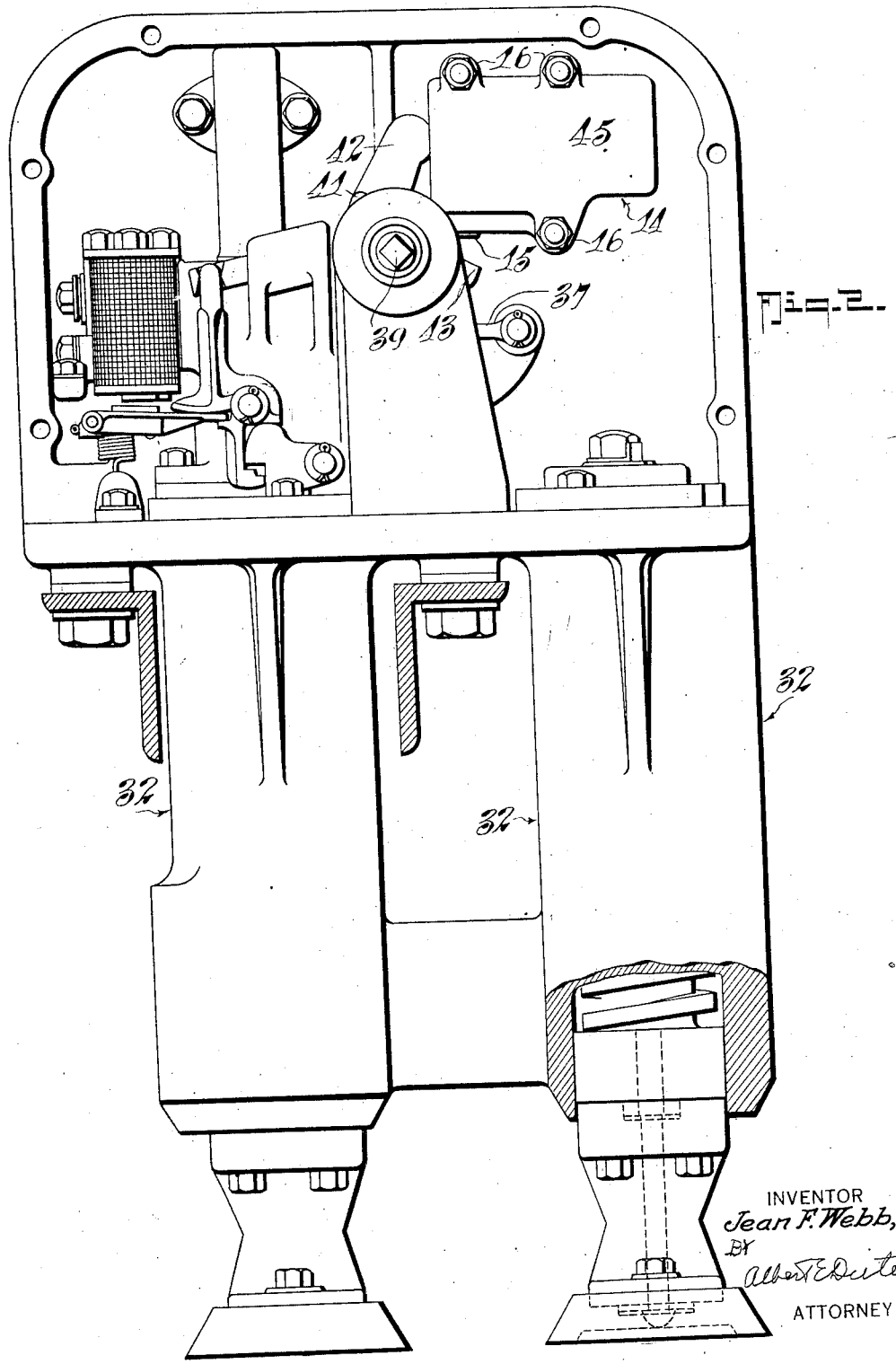

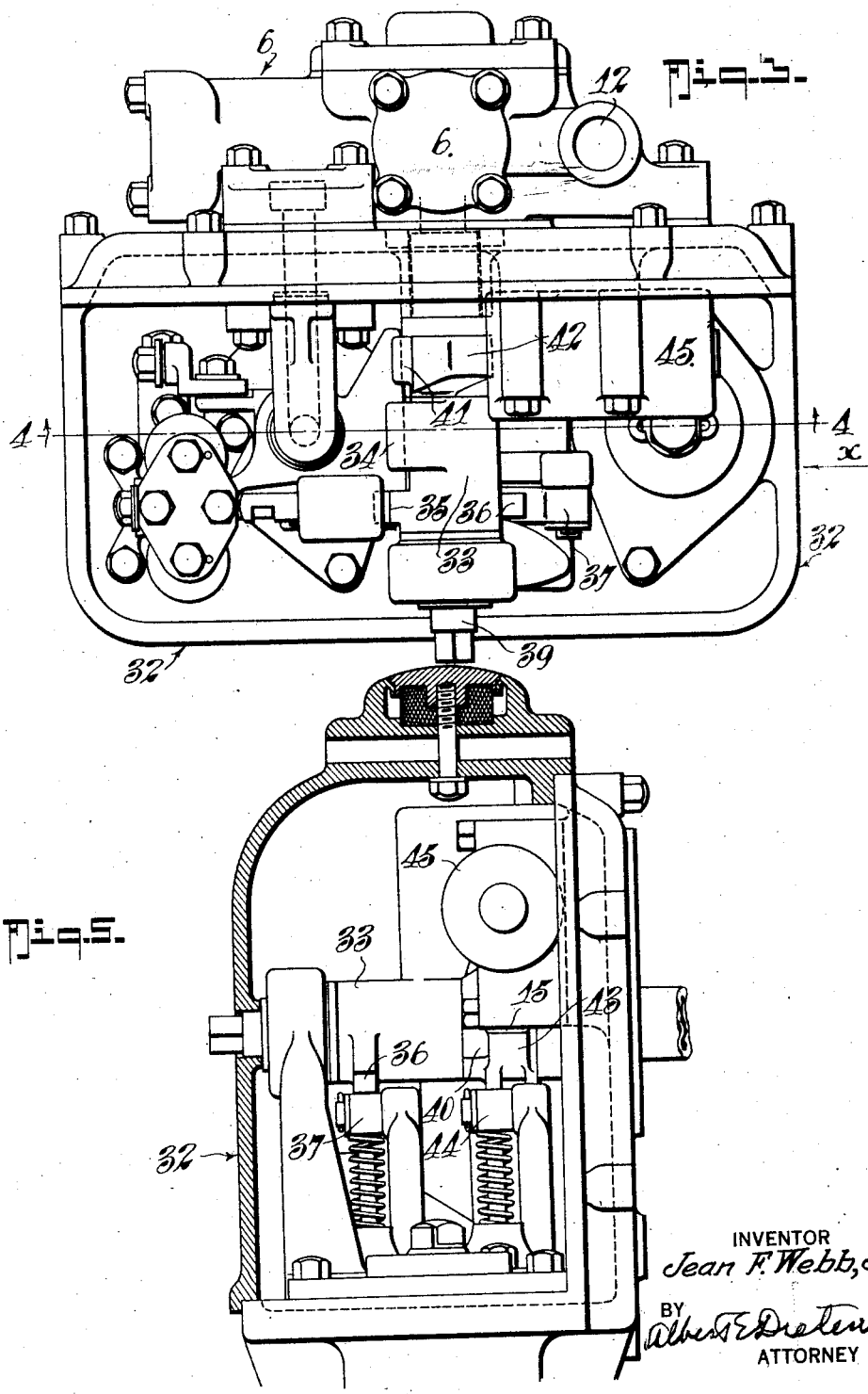

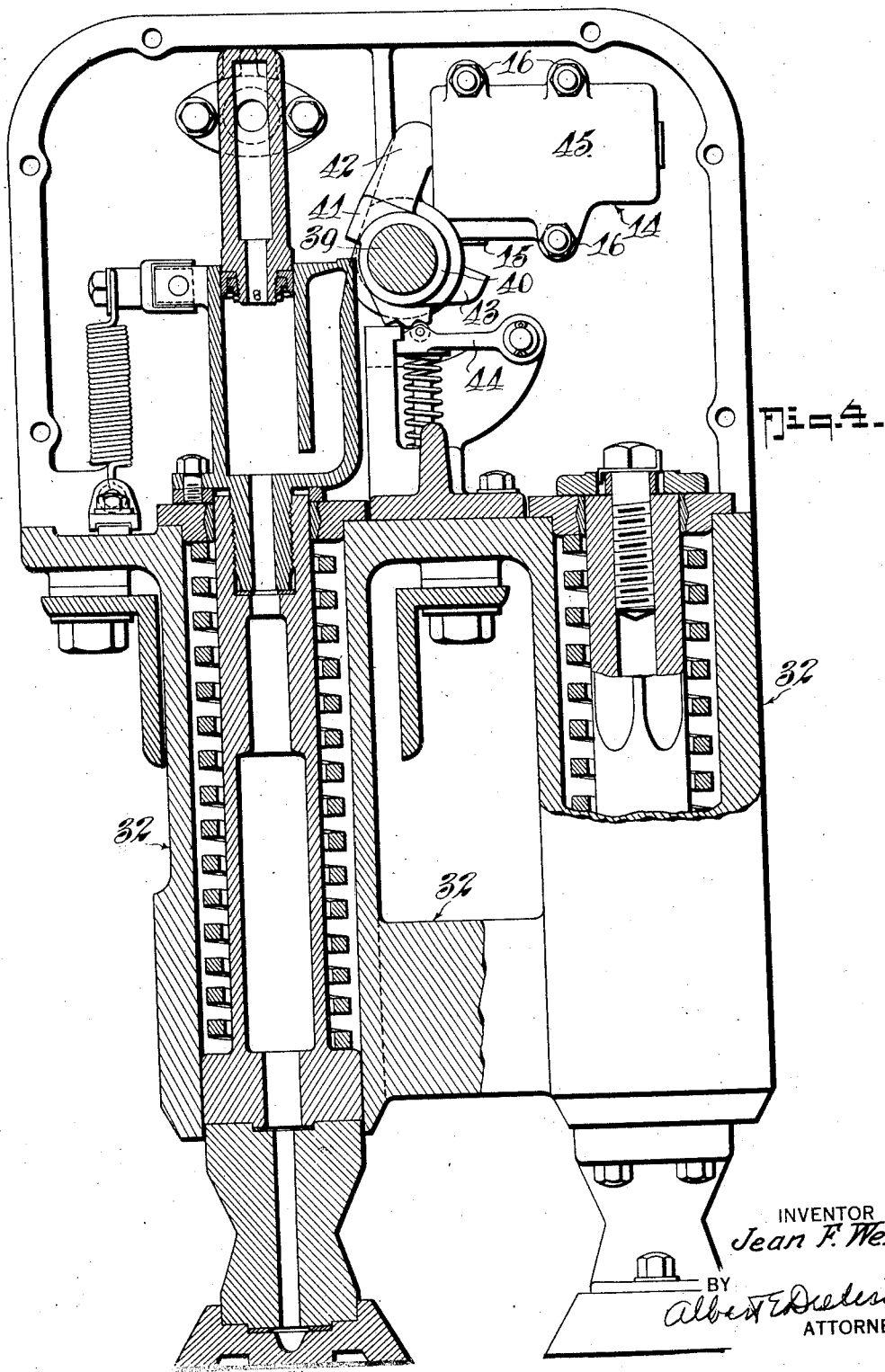

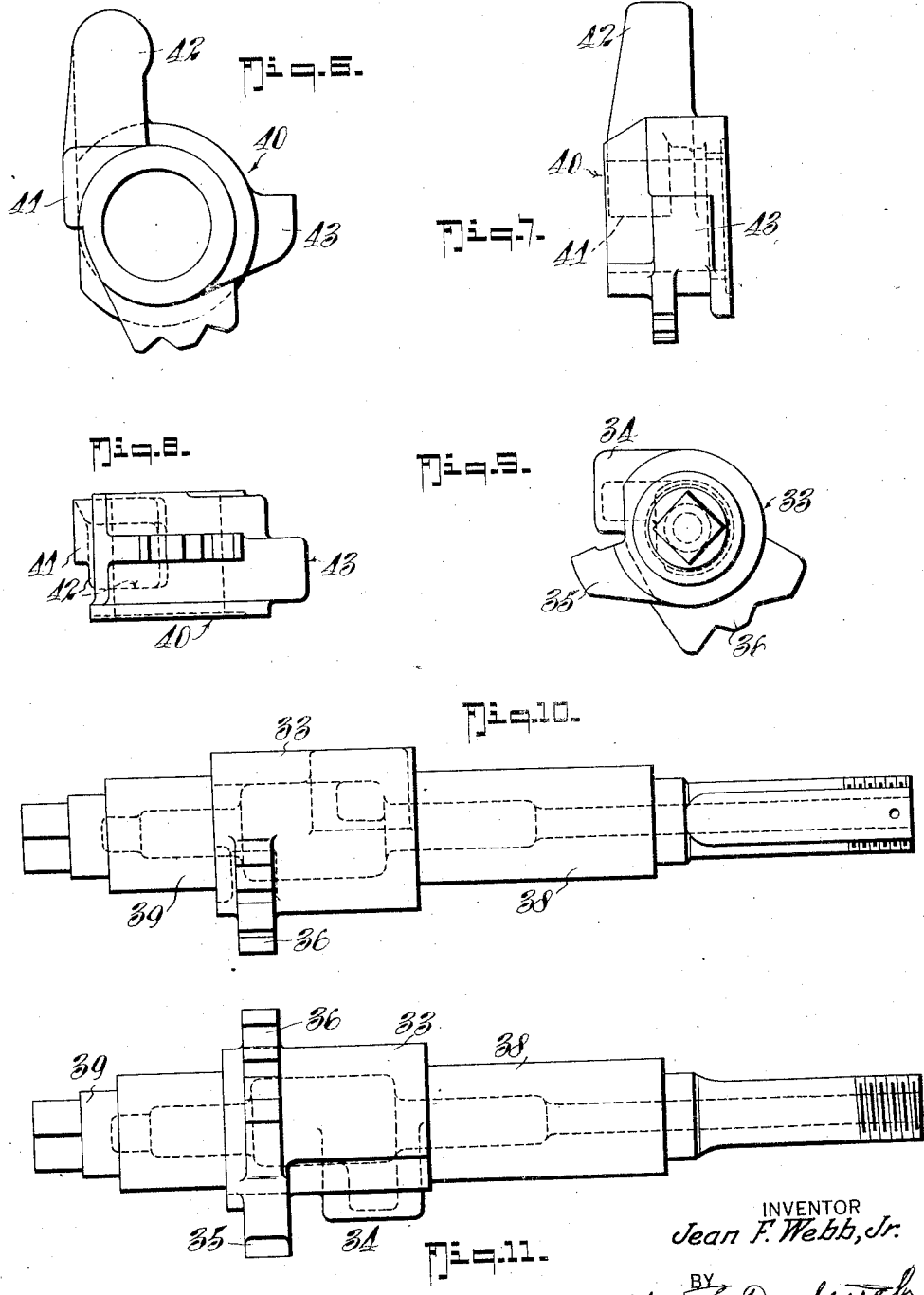

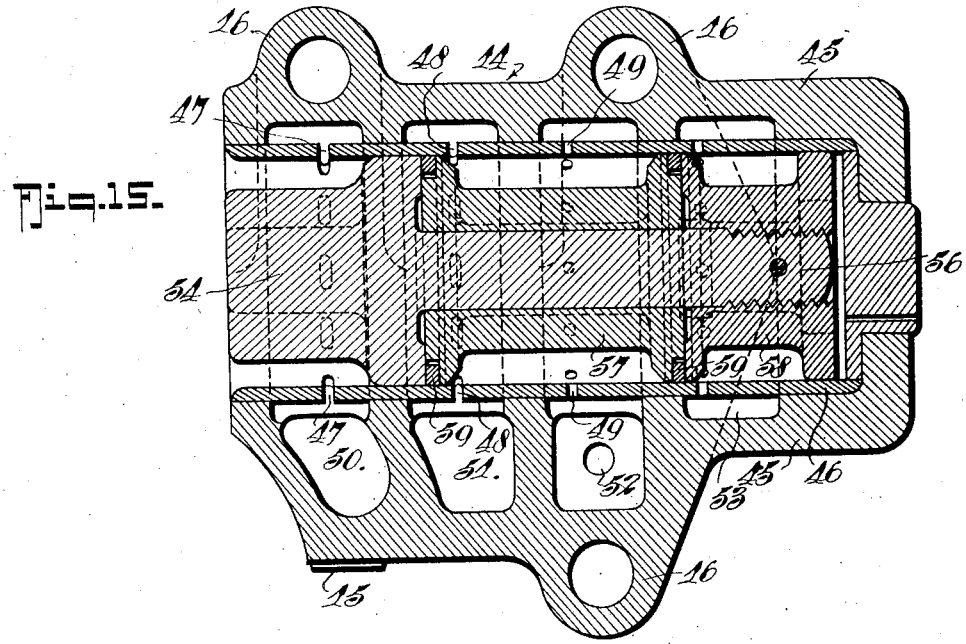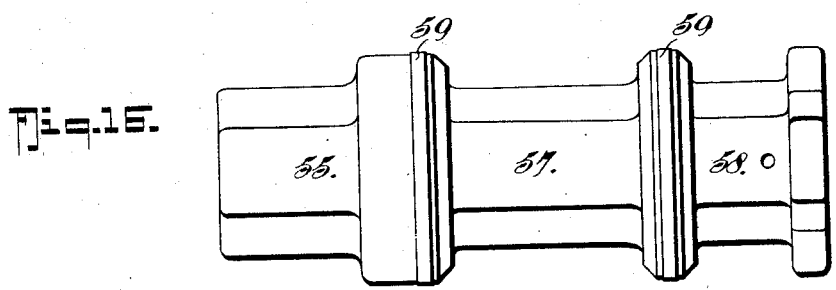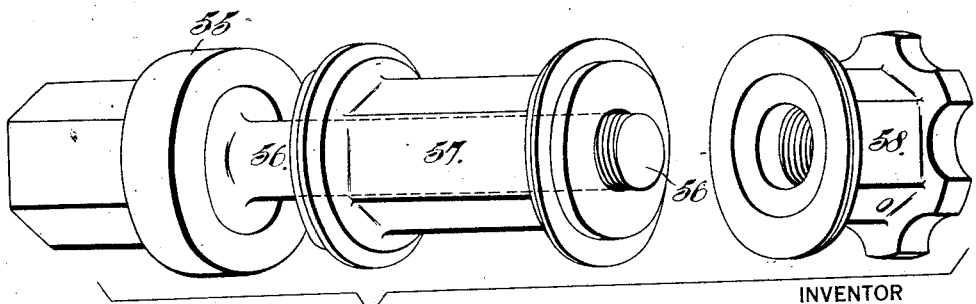

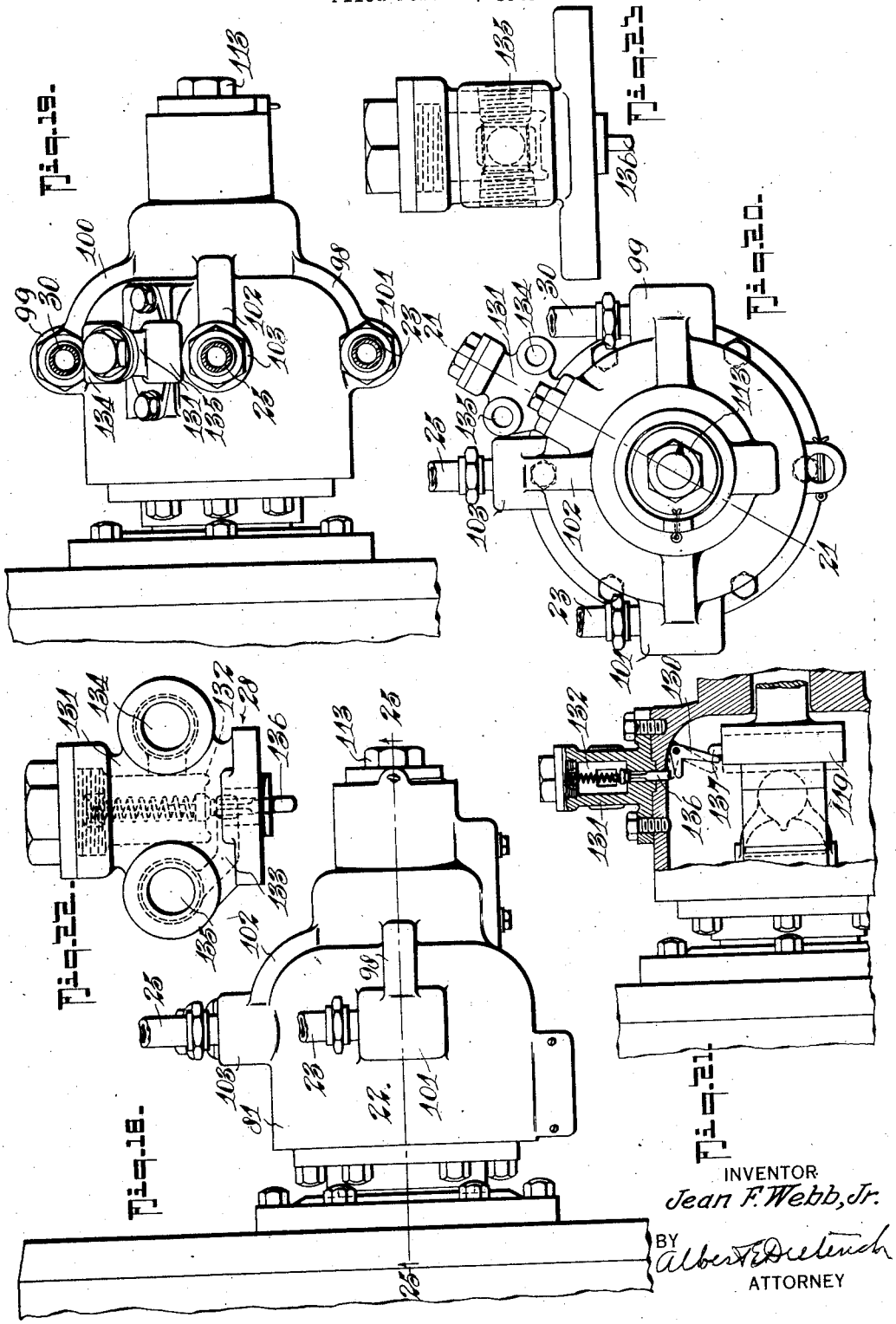

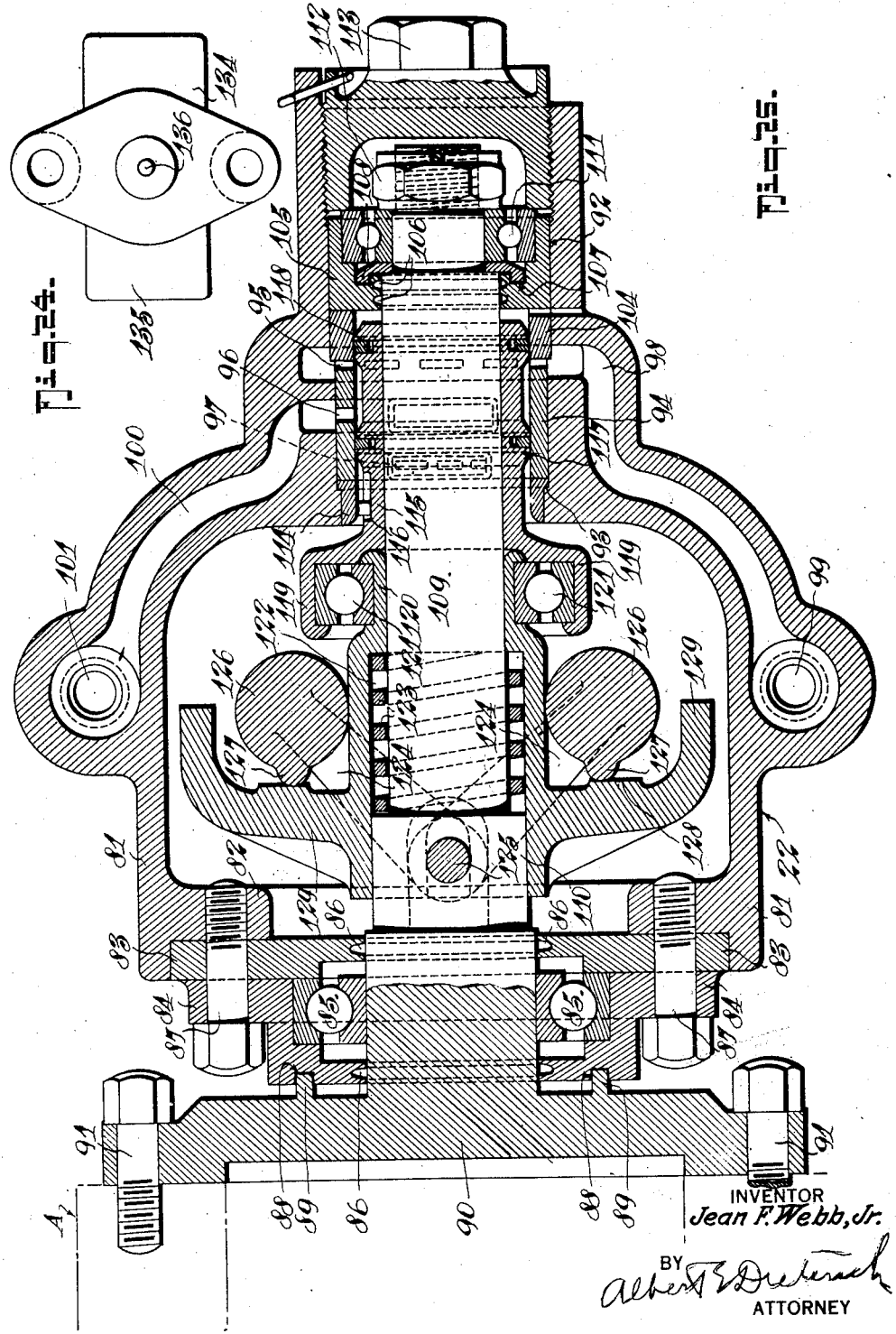

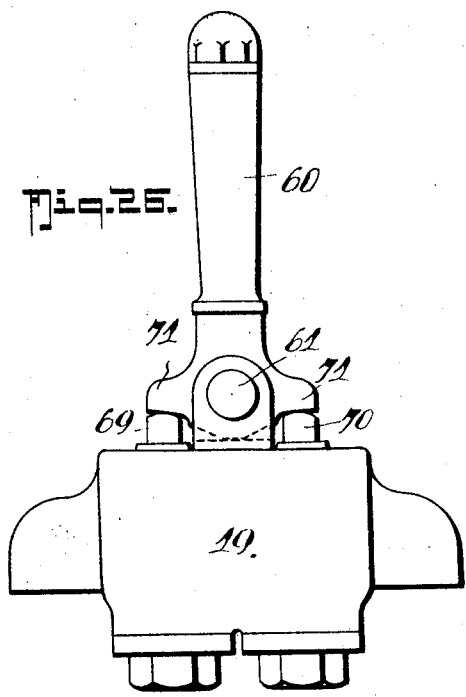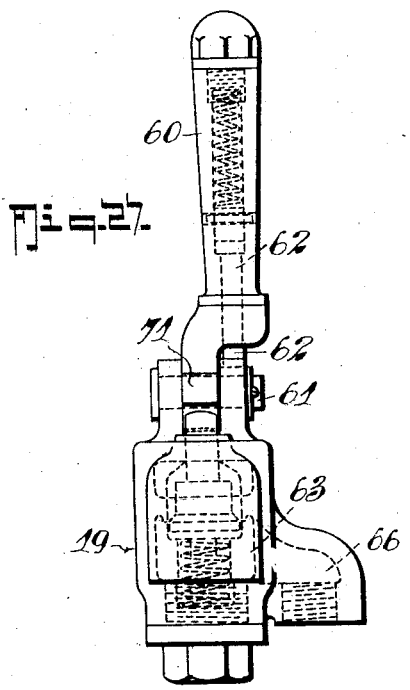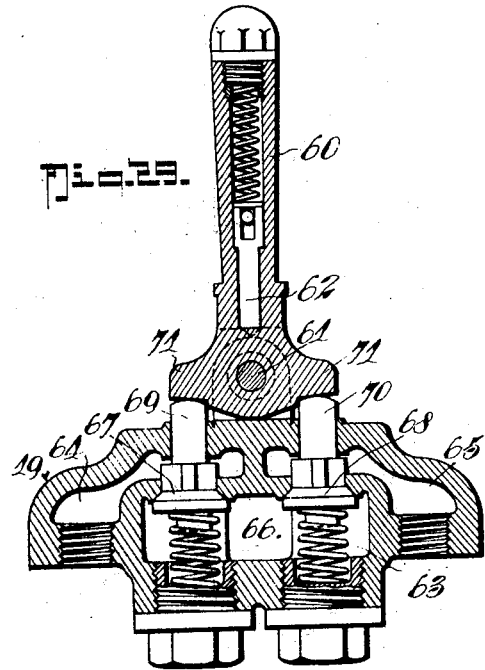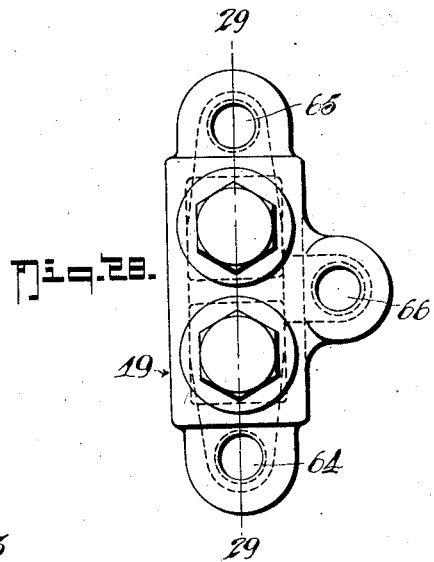

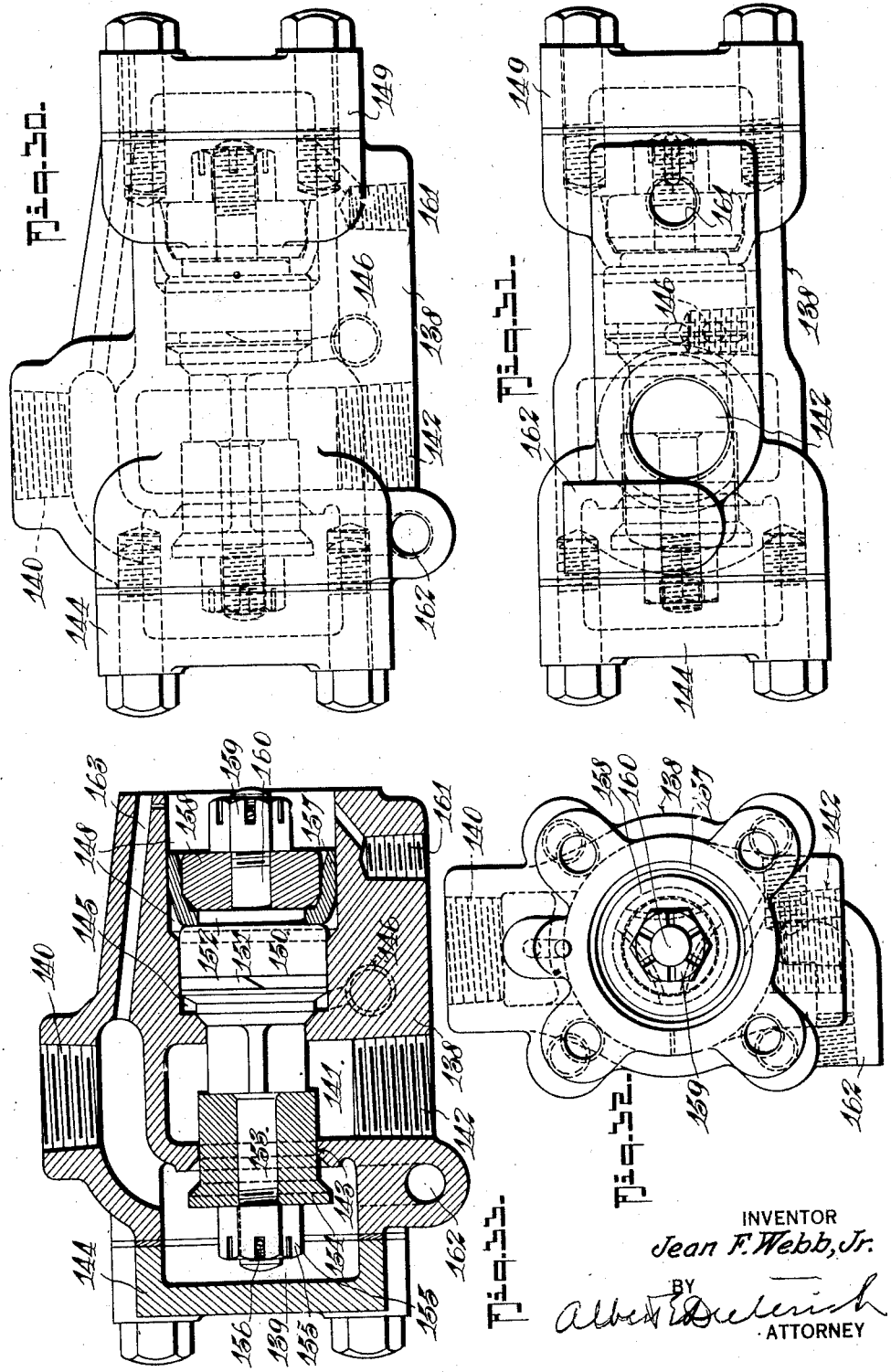

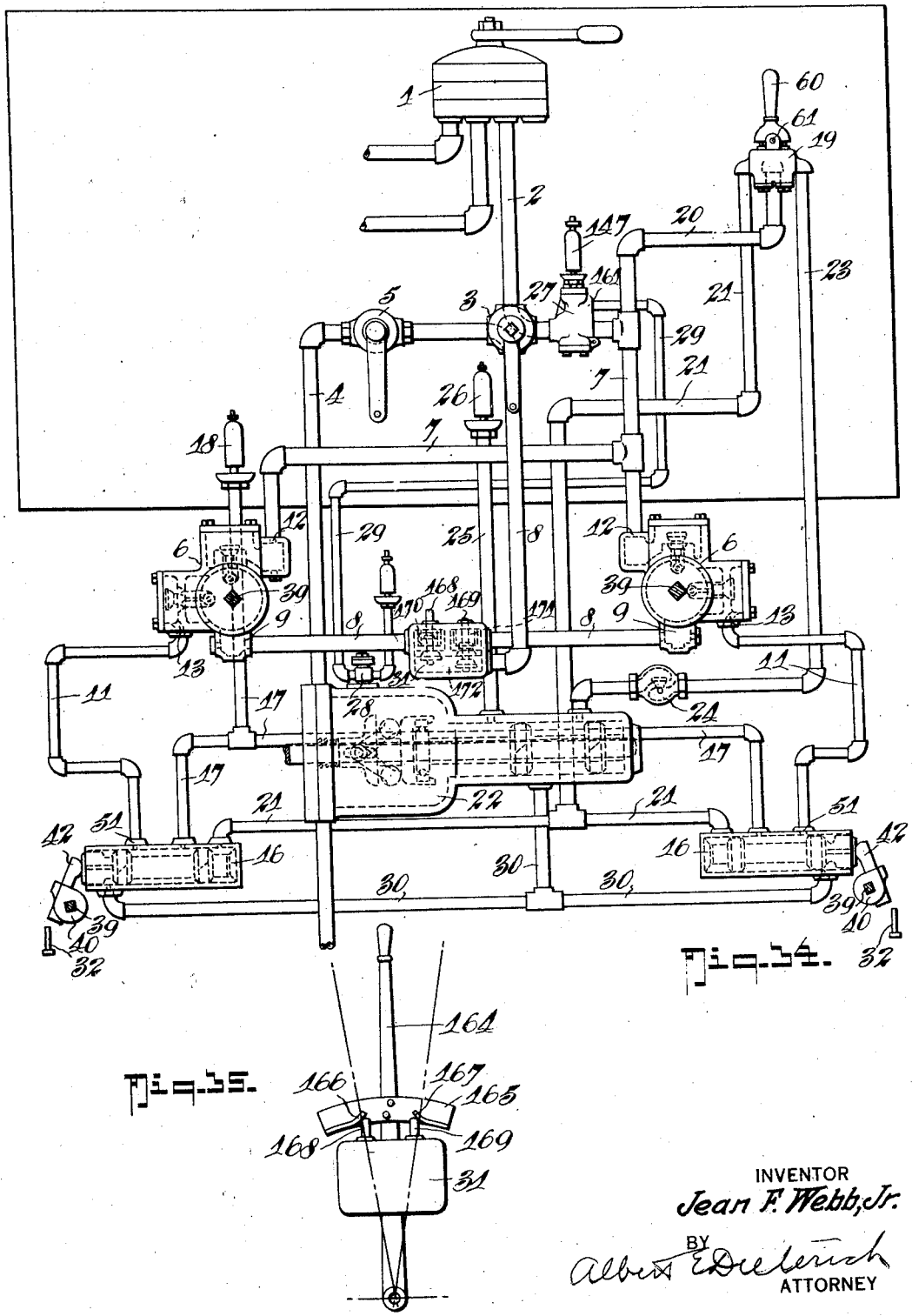

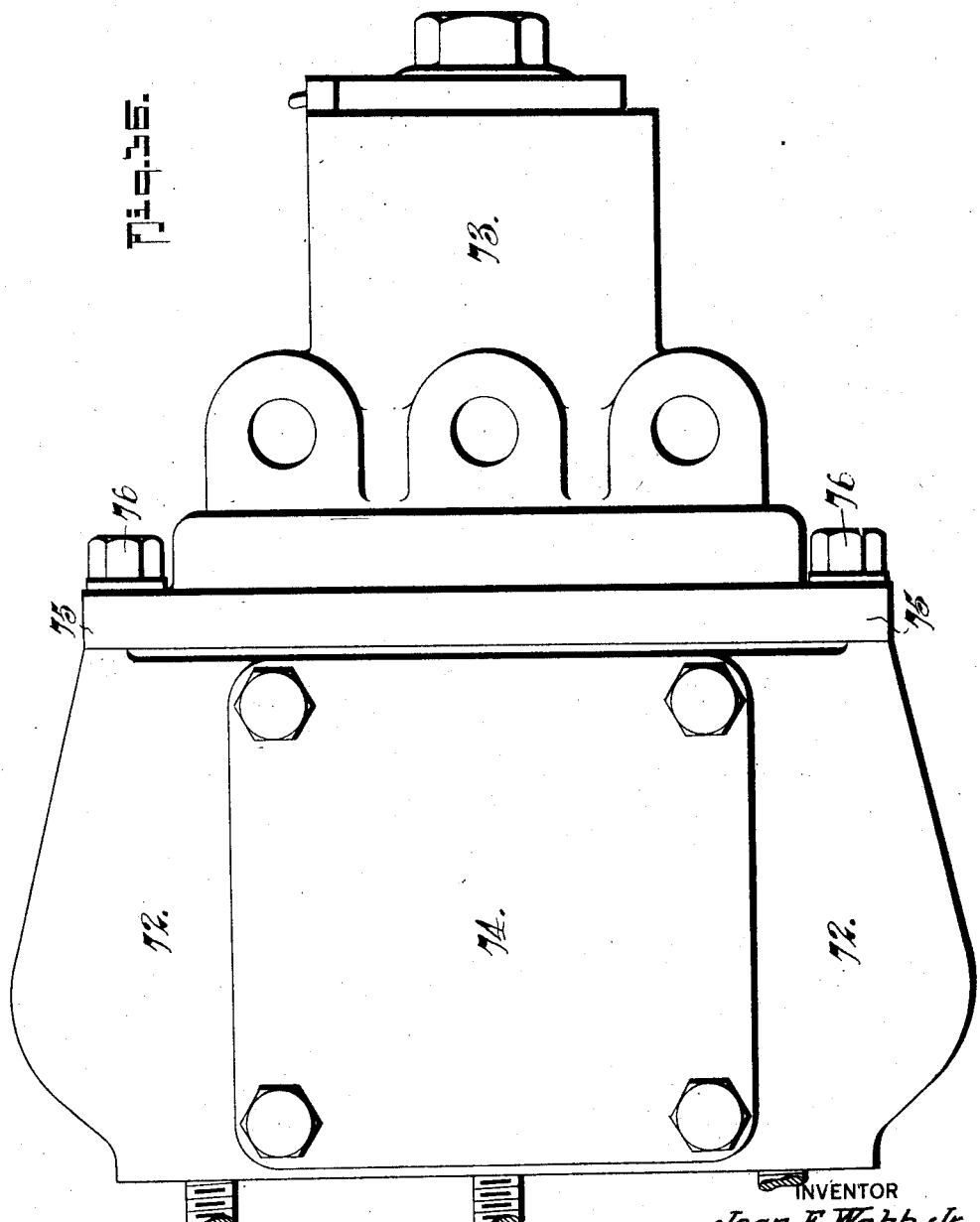

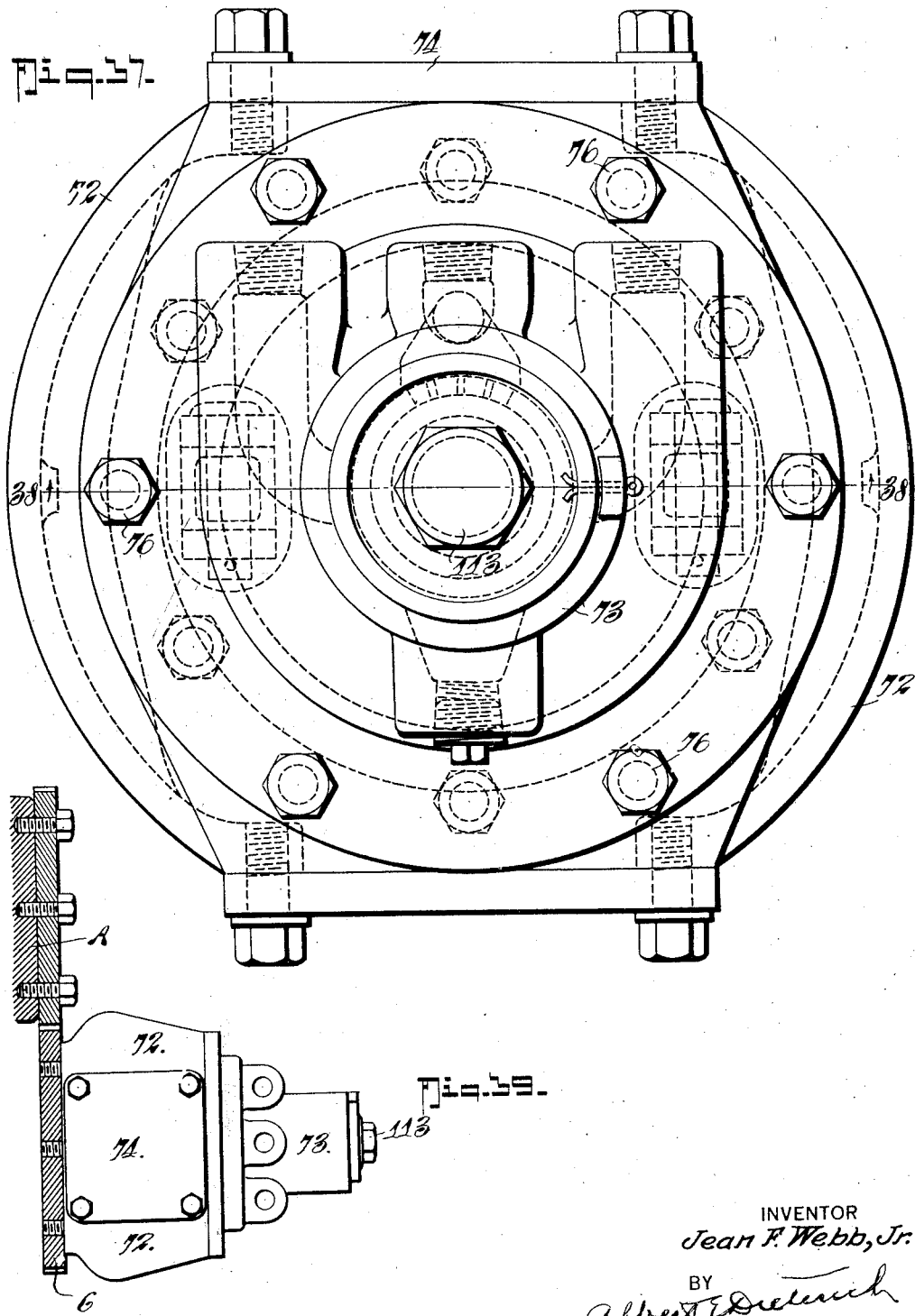

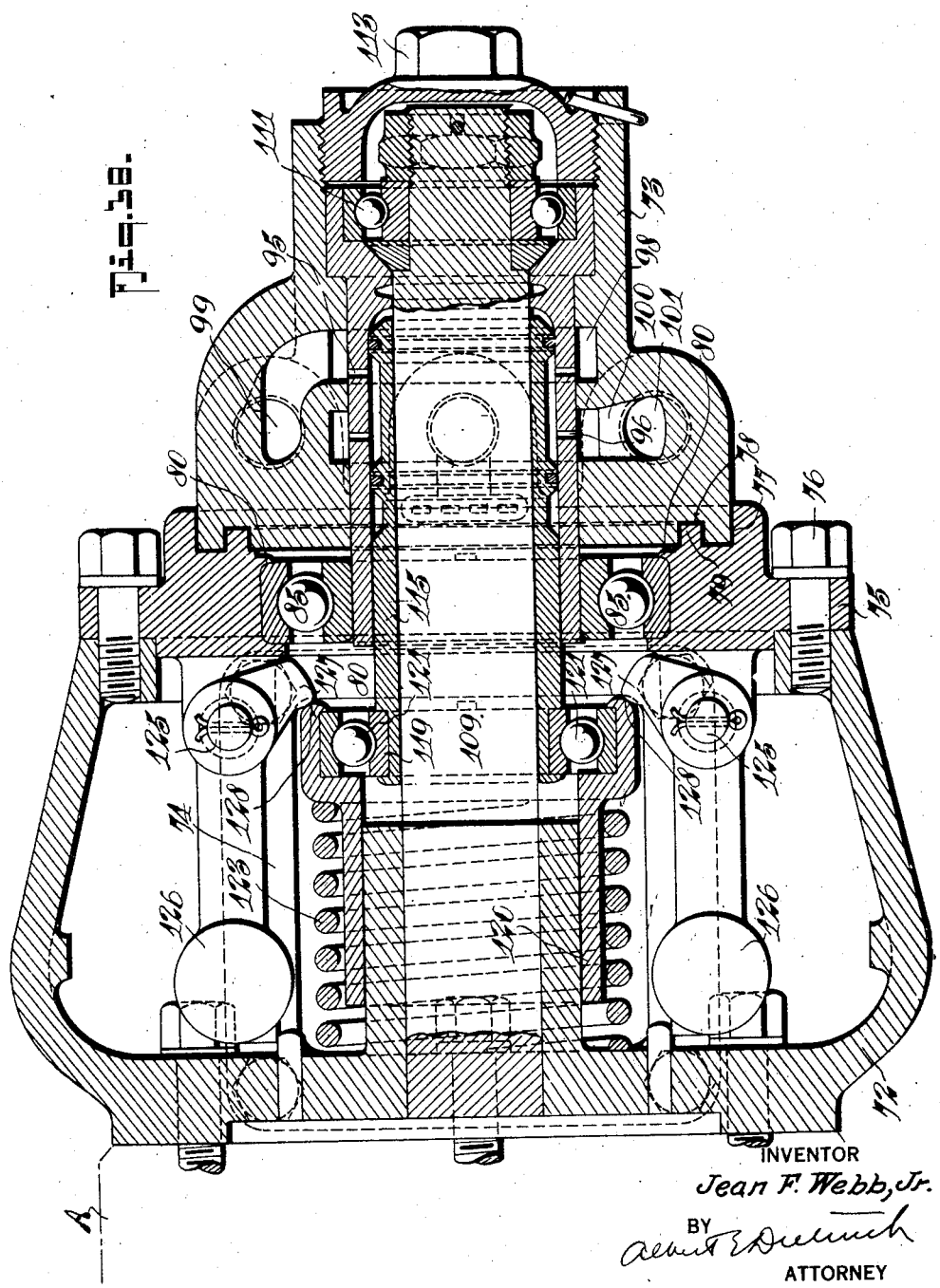

Patented Oct. 12, 1926.

1,602,513

UNITED STATES PATENT OFFICE.

JEAN F. WEBB, JR., OF NEW YORK, N. Y., ASSIGNOR TO THE INTERNATIONAL SIGNAL CO., A CORPORATION OF ARIZONA.

TRAIN-STOPPING SYSTEM.

Application filed February 26, 1925. Serial No. 11,868.

My present invention relates to the art of train operation and control and more especially to systems for effecting automatic stopping of the train should the engineer not be alert and run past a danger signal.

The objects of the present invention are to provide such a system in which provision is made whereby the engineer may so manipulate the mechanism so as to convert its operation from that of a full automatic stop action to a minimum speed control action in the application of the brakes; to provide a system having, if desired, a maximum speed control whereby should the train exceed the predetermined maximum speed the brakes will be set until the speed is again reduced to below the predetermined maximum speed; to provide a system in which the automatic train control valve mechanism of the type disclosed in my Patent #1,487,991, issued March 25, 1924, and the valve operating plunger mechanism of the type disclosed in my application, Serial No. 609,864, filed December 30, 1922, may be advantageously employed, the present invention including such modification of the plunger mechanism as will adapt the same to the present uses.

In carrying out my present invention I substitute for the resetting cylinder and piston of the plunger device what I here term a selective valve device, and substitute for the resetting lug, which is fixed on the main cam shaft in the apparatus of my application aforesaid, a loose cam with lug so mounted as to turn on the cam shaft but so associated with the main cam and the plunger mechanism as to move with the main cam in one direction only (i. e. when engaged by the plunger on its upstroke), this lug serving, by its engagement with the selective valve piston, to set the selective valve piston to its normal position, and also to constitute a limiting stop therefor when the selective valve piston is moved to the position which converts the action from an emergency stop to a minimum speed control action.

The present invention also includes those novel combinations of mechanism by which the desired results are attained, as well as such improvements and adaptations of the plunger mechanism, etc. as above referred to.

With other objects in view which will be hereinafter appparent, the invention resides in those novel structures, combinations and arrrangement of parts, all of which will be first fully described, then be specifically pointed out in the appended claims, reference being had to the accompanying drawings, in which:—

Figure 1 is a diagrammatic view of my invention designed for both maximum and minimum speed control.

Figure 2 is an enlarged elevation of a portion of the train stop plunger and cam mechanism of the type of my application aforesaid, adapted however to the present invention.

Figure 3 is a top plan view of the mechanism shown in Figure 2.

Figure 4 is a cross section on the line 4—4 of Figure 3.

Figure 5 is a detail elevation in the direction of the arrow $x$ in Figure 3.

Figure 6 is a detail side elevation of the selective valve cam.

Figure 7 is a detail edge elevation of the selective valve cam.

Figure 8 is an inverted plan view of the selective valve cam.

Figure 9 is a detail end elevation of the main cam.

Figure 10 is a side elevation of the main cam.

Figure 11 is a detail inverted plan view of the main cam.

Figure 12 is an enlarged side elevation of the selective valve mechanism.

Figure 13 is an enlarged rear elevation of the selective valve mechanism.

Figure 14 is an enlarged inverted plan view of the selective valve mechanism.

Figure 15 is a vertical section on the line 15—15 of Figure 14.

Figure 16 is an elevation of the valve piston assembled.

Figure 17 is an elevation of the same disassembled.

Figure 18 is a side elevation of the speed governor.

Figure 19 is a top plan view of the speed governor.

Figure 20 is an end elevation of the governor.

Figure 21 is a detail vertical section on the line 21—21 of Figure 20.

Figure 22 is a front elevation of the maximum speed control valve.

Figure 23 is a side elevation of the same.

Figure 24 is an inverted plan view of the same.

Figure 25 is an enlarged horizontal longitudinal section of the governor on line 25—25 of Figure 18.

Figure 26 is a front elevation of the acknowledgment valve.

Figure 27 is a side elevation of the acknowledgment valve.

Figure 28 is a bottom plan view of the acknowledgment valve.

Figure 29 is a vertical section of the acknowledgment valve on the line 29—29 of Figure 28.

Figure 30 is a side elevation of the blanking valve.

Figure 31 is a bottom plan view of the blanking valve.

Figure 32 is an end elevation of the blanking valve with the cap plate removed.

Figure 33 is a vertical longitudinal section of the blanking valve.

Figure 34 is a diagrammatic view showing the connection for double equipment (right and left) service.

Figure 35 is a detail elevation of the directional valve and showing how it may be operated by the reverse lever of the locomotive.

Figure 36 is a plan view of a modified form of governor mechanism.

Figure 37 is an end view of the same.

Figure 38 is a horizontal section on line 38—38 of Figure 37.

Figure 39 is a diagrammatic view hereinafter referred to.

Referring now to the accompanying drawings, in which like numerals of reference indicate like parts in all the figures, 1 represents the engineer's valve which is connected to the train line section 2 that in turn connects with the train line 4 through the cut-out cock 3 and double heading cock 5 in the usual manner. All of these parts may be of the ordinary and conventional construction.

6 designates the automatic train control valve, the construction of which may be that disclosed in my Patent No. 1,487,991 hereinbefore referred to and a detailed description thereof in this application is thought to be unnecessary.

7 designates a pipe connecting the cut-out cock with the inlet port 12 of the automatic train control valve 6 while 8 designates a pipe from the cut-out cock to the port 9 of the automatic train control valve 6. The port 9 of the automatic train control valve 6 is the one that connects with the main chamber of the valve.

The outlet port 13 of the train control valve 6 is connected by a pipe 11 to the selective valve 14 (hereinafter referred to).

17 is a pipe which connects with the outlet port of the selective valve 14 and delivers to atmosphere through the indication whistle 18.

An acknowledgement valve mechanism 19 is provided which is connected by a pipe 20 to the pipe 7 and which is connected by a pipe 21 to the selective valve mechanism 14. The acknowledgement valve is also connected by a pipe 23 in which is a check valve 24 to the valve mechanism of the centrifugal speed control governor device 22.

From the centrifugal speed control governor device a pipe 25 leads to atmosphere through the speed control whistle 26. 30 designates a pipe from the centrifugal speed control mechanism to the selective valve 14.

27 designates a blanking valve (the construction of which will be hereinafter explained) and 28 designates a maximum speed control valve associated with the centrifugal governor and connected by a duct or pipe 29 with the blanking valve to control its operation.

When the system is used on double equipment a directional valve 31 is connected in the system in the manner indicated in Figure 34 and is preferably controlled by the operation of the reverse lever of the engine to bring one or the other set of mechanisms into functional connection according to the direction in which the locomotive is moving, of which more will be said later.

32 represents the plunger mechanism, the construction of which may be substantially the same as that disclosed in my application aforesaid, and 33 represents the main cam which is operated by the plunger mechanism and in turn operates the automatic train control valve mechanism 6, the main cam constituting a connecting part of the plunger-valve mechanism. 34 is the valve opening lip of the main cam and 35 is a resetting lug thereof, while 36 designates the locking rib of the main cam and 37 designates the cam lock that is associated with the locking lip to hold the cam in either of two positions to which it may be moved by the plunger action.

As the general construction of the plunger mechanism of the automatic train control is well known (see my application aforesaid) a detailed illustration and description thereof in this application is thought to be unnecessary. In adapting the plunger-automatic-control-valve mechanisms of my patent and application aforesaid to the present system the main shaft 39 is provided with a bearing part 38 for the selective valve cam 40 on which that cam is free to turn.

The selective valve cam 40 has a lip 41 to be engaged by the plunger on its upstroke to turn the selective valve cam to bring its lug 42 into the normal position shown diagrammatically in Figure 1, thereby causing movement of the valve-piston of the selective valve mechanism 14 inwardly.

43 is the stop rib of the selective valve cam with which is associated a cam lock 44 and a stop portion 15 of the casing 45, the latter limiting the movement of the selective valve cam under the influence of the valve-piston of the selective valve mechanism 14 as will later be more clearly understood.

The selective valve mechanism includes a housing provided with fastening lugs 16 by means of which it may be secured in place on the support of the plunger mechanism in lieu of the resetting cylinder shown in my application aforesaid.

The housing includes a barrel 45 in which the valve lining 46 is located, the valve lining 46 having sets of ports 47, 48 and 49, while the casing or housing has a duct 50 to which the pipe 30 connects, a duct 51 to which the pipe 11 connects, a duct 52 to which the pipe 17 connects and a duct 53 to which the pipe 21 connects. These several ducts 50, 51 and 52 are associated with the respective sets of ports 47, 48 and 49 which are controlled by the double-piston 54 of the valve mechanism 14. The piston 54 is preferably made in sections, one end section 55 having a stem 56 and the other end section 58 being threaded thereon and cotter-pinned to hold the intermediate section 57 in place, thus facilitating the placement of the packing rings 59.

The acknowledgment valve 19 has a handle 60 fulcrumed on a pin 61 and held in the neutral or central position by a spring latch 62. The main chamber 63 of the housing of the acknowledgment valve 19 communicates with branch chambers 64 and 65 through valved passages.

66 designates the inlet to chamber 63 from the train line connection pipe 20. 67 indicates the valve controlling the passage between chambers 63 and 64, the latter chamber being the branch to which pipe 21 connects, and 68 designates the valve between chambers 63 and 65, the latter being the chamber with which the pipe 23 connects. The valves 67 and 68 have stems 69 and 70 respectively which engage the heels 71 of the handle 60 and are operated by movement of the handle in one direction or the other.

81 designates the housing of the governor mechanism 22 (embodiment of Figure 25) which housing has an inner flange 82 to which the ball race retainer inner flange plate 83 and the ball race retainer outer cap plate 84 are secured by cap screws 87. 85 indicates a ball bearing with its race held between the plates 83 and 84 and forming a bearing for the shaft portion of the governor.

86 designates groove oil restrainers and 88 indicates an oil seal groove into which the flange 89 on the shaft base plate 90 projects. The shaft base plate 90 is fixed to the end of the axle A by cap screws 91, the axle A being any suitable axle of the locomotive, as for example one of the front truck axles.

The casing 81 has a valve chamber portion 92 that is shouldered at 93 against which the bushing 114 sets. 94 is the valve bushing which has ports 95 and 96 and 97. The casing or housing 81 has a duct 98 between the port 95 and the port 99 to which the pipe 23 connects. It also has a duct 100 between the port 96 and the port 101 to which the pipe 20 connects. It has another duct 102 between the port 97 and the port 103 to which the pipe 25 connects. The arrangement of these various ports and ducts is best shown in Figures 1 and 25 of the drawings.

104 is a spacing ring against which the shaft end oil retainer and inner bearing-retainer 105 is held. The shaft and oil retaining and inner bearing-retainer 105 has oil grooves 106 and 107, in the latter of which the flange of the oil hold-back flange plate 108 projects.

109 is the shaft portion on which the valve sleeve 115 and the governor thrust finger sleeve 120 slide, and the shaft includes an enlargement 110 forming a slide bearing for the portion of the thrust finger slide.

112 is a retaining nut which holds the inner race of the ball bearing 111 and the flange plate 108 in position on the shaft 109 while a cap plug 113 is screwed into the valve chamber portion 92 of the casing 81 and holds the outer race of the bearing 111 and the members 105, 104, 94 and 114 in place. The ring 114 is provided with a lug that operates in a slot 116 in the slidable piston valve sleeve 115 to prevent rotation of the piston valve sleeve. The piston valve sleeve has two packed piston valves 117 and 118 which control passage through the various ports 95, 96 and 97 according to the position of the piston valve sleeve 115.

119 is the outer ball bearing race retainer portion of the piston valve sleeve 115 which cooperates with the portion 120 of the ball finger's sleeve to hold the ball bearing 121 in place and through it effect a coupling between the sliding sleeve 115 and the rotating governor fingers 129. 122 designates the space or pocket in the governor slide chamber in which the return spring 123 is located.

124 indicates ball levers fulcrumed on a pin 125 that passes through the enlargement 110 of the shaft 109 and these levers carry portions 126 having thrust bearing teats 127 that engage the surface 128 on the fingers 129 to effect movement thereof against the tension of the spring 123 as the balls 124 are thrown out under centrifugal force.

In the embodiment of the governor mechanism illustrated in Figures 36 to 39 the casing is made in two parts 72 and 73, the rotative part 72 having doors 74 and an end ring plate 75 secured by cap screws 76 and recessed at 77 for the reception of the section 73. The part 73 has a groove 78 to receive a flange 79 of the plate 75. The ball bearing 85 may be held by burs 80 against displacement.

In this embodiment also the parts having like purposes and of equivalent structure to those of the former embodiment bear the same reference numbers as in the first embodiment illustrated. The governor may be directly secured to the axle A or be connected therewith by gears G as diagrammatically illustrated in Figure 39.

130 is a high speed control valve operating bell crank (Figure 21) which operates on the plunger or stem 136 of the high speed control valve. 131 is the casing of the high speed control valve which is mounted on the governor casing 81 and has an inlet chamber 132 and outlet chamber 133 as well as an inlet port 134 and an outlet port 135. The bell crank 130 is moved by the lug 137.

The valve 28 has its stem 136 adapted to be engaged by the bell crank 130 as before stated and it may be held seated under the influence of a light spring as indicated in the drawings.

138 is the casing of the blanking valve 27, the same having an inlet chamber 139 in communication with the inlet port 140 and adapted to communicate through a valve seat passage 143 with the intermediate chamber 141, the latter being in communication with the port 142 hereinafter again referred to.

144 is a cap to close one end of the casing 138, i. e., the end having the chamber 139. 145 is the outlet chamber of the blanking valve and 146 is the outlet port thereof to atmosphere through indicating whistle 147. 148 indicates the blanking valve governor-chamber which is closed on the outer side by a cap 149. 150 is the blanking valve piston which has a packing ring 151.

152 represents the outlet valve head and 153 represents the threaded stem on which the inlet valve head 154 is secured by a castellated nut 155. 157 is a cup washer and 158 is a cup washer retainer, the cup washer and the retainer being held in place by the castellated nut 159 and cotter pin 156 on the threaded stem 160.

161 is a port in the blanking valve casing 138 to which the pipe 29 connects while 162 designates a drain port and 163 a duct from the inlet chamber 139 to the blanking valve governor chamber 148.

164 indicates the usual reversing lever which, when the invention is adapted for right and left equipment, may be provided with a cam plate 165 having cam portions 166 and 167 adapted alternately to engage the stems 168 and 169 of the directional valve mechanism 31, the construction of which, in general, is quite similar to that of the acknowledgment valve. The directional valve mechanism 31 has three chambers 170, 171 and 172, the chambers 170 and 171 being connected by ducts 8 to the respective train control valve ports 9 and the chamber 172 being connected by a duct 8 with the cut-out cock. The passages between the several chambers are controlled by the valves 168 and 169.

So far as described the manner in which my invention operates will be best understood as follows, reference being had particularly to diagrammatic Figure 1.

The selective valve cam 40 is mounted on, but not attached to, the main cam 33 which controls the movements of the air valve, as hereinbefore described. The passage of the plunger over a ramp, elevates the plunger-head which engages at the same time the respective lips 34 and 41 of both the main cam 33 and the selective valve cam 40 and oscillates the main cam to the abnormal, or air-valve opening, position, and the selective valve cam to the normal or piston-retracted, position.

If the ramp is an energized (clear) ramp, the main cam 33 is reversely oscillated in the usual manner as the plunger leaves the ramp, and the air valve is restored to its normal, or valve-closed, position. The selective valve cam 40 however is left in its normal or piston-retracted, position.

If the ramp is a de-energized (stop) ramp, the main cam 33 is left in its abnormal, or valve-opening, position, and the selective valve cam 40 in its normal position, as the plunger leaves the ramp. The main cam 33 then remains in its abnormal, or valve-opening, position, until an energized (clear) ramp is reached, as the engineman has no means, except manual, of restoring it to its normal, or valve-closed position.

The train line air escaping from the now open train control valve goes into the chamber between the two piston rings 59 of the piston 57 of the selective valve and then out of that chamber to the atmosphere through the indication whistle 18. If unaltered, this effects a plain automatic stop action.

If the engineman is alive and alert and desires to convert this automatic stop action into a speed controlled action, he moves his acknowledgment valve 19 so as to introduce air (which may be main reservoir air) behind the right hand ring 59 of the piston 57 of the selective valve, and thus push forward (to the left) the piston of the selective valve. This movement cuts off the port to the indication whistle and connects the chamber between the two selective valve piston rings 59 with the port leading to the speed control mechanism, where the escaping train line air enters the chamber between the two piston rings 117 and 118 of the speed control mechanism.

If the engineman has properly obeyed the caution signal and reduced his speed to, or below, the predetermined minimum, before passing the stop ramp, the chamber between the two piston rings 117 and 118 of the speed control has no port to the atmosphere, and consequently no braking action takes place.

If the engineman, however, has passed over the stop ramp above the predetermined minimum speed, the air chamber between the two piston rings of the speed control is connected with the atmosphere through the port leading to the speed control whistle. The escaping train line air thereupon reduces the pressure in the train line until the triple valves effect a brake action, which in turn reduces the speed of the train. When the speed has been reduced to the predetermined minimum, the spring tension of the speed control overcoming the action of the governor balls pushes backward (to the right), the speed control piston cutting off the port to the atmosphere through the speed control whistle. The stopping of this whistle informs the engineman that his speed has been reduced to the predetermined minimum, but his brakes are still set; and, if he wishes to avoid an automatic stop, he must move his acknowledgment valve so that main reservoir air can be introduced into the train line by means of the pipe 23 leading through the speed control and the selective valve. Main reservoir air, so introduced, effects a releasing of the brakes with normal rapidity, and the engineman can then proceed at, or below, the predetermined minimum.

Any acceleration, however, at this time will again connect the train line air with the port to the atmosphere through the speed control whistle, and the braking action will be renewed and can be nullified only in the manner just above described.

This condition continues until the next ramp is reached. The passage of the plunger over this ramp will restore the selective valve cam to its normal, or piston-retracted position, which movement of the piston again connects the chamber between the two rings of the selective valve piston with the atmosphere through the indication whistle, thus converting the speed controlled action again into an automatic stop action; and this automatic stop action can only be converted into a speed controlled action by again moving the acknowledgement valve as before. These respective movements continue until a clear ramp is reached and the main cam is reversely oscillated to its normal, or valve-closed, position, whereupon no further train line air can escape through the air valve, and then the engineman can proceed at indefinite speed.

Should the maximum speed control be used as a part of the system, it will be seen that so long as the train is proceeding at a speed below the predetermined maximum the valve 28 will remain closed, thus holding the air pressure in the chamber 148 of the blanking valve which, acting on large area of the pistons 157 and 158, keeps the valve 154 open and valve 152 closed. When, however, the speed reaches the maximum, the valve 28 will be opened to release the air from the chamber 148, thus allowing the valve 154 to close and the valve 152 to open, which permits train line air to be released from the port 146 via pipe 10 and indication whistle 147 to atmosphere to set the brakes.

As soon however as the train speed falls below the maximum allowed the valve 28 will close and permit main reservoir pressure to build up again in the chamber 148 which, acting on pistons 158 and 157, recloses the valve 152 and reopens the valve 154, thus restoring the parts to the normal positions again.

When the apparatus is used for right and left equipment the selective valves (one being used with each automatic train control valve and plunger device) may be operated by a single acknowledgment valve, the connections being made as illustrated diagrammatically in Figure 35 and as this is a mere duplication of the parts further and detailed description thereof is thought to be unnecessary.

What I claim is:

1. In an air brake system of the mechanically actuated air valve and plunger type wherein means are provided for operating to open the air valve at each signal station and thereafter immediately close the same if the right of way is clear; the combination with the air brake valve and the train line of means for converting the action of said valve from an automatic stop to a speed control action.

2. In an air brake system of the mechanically actuated air valve and plunger type wherein means are provided for operating to open the air valve at each signal station and thereafter immediately close the same if the right of way is clear; the combination with the air brake valve and the train line of means for converting the action of said valve from an automatic stop to a minimum speed control action.

3. In an air brake system of the mechanically actuated air valve and plunger type wherein means are provided for operating to open the air valve at each signal station and thereafter immediately close the same if the right of way is clear; the combination with the air brake valve and the train line of a minimum speed control mechanism associated with said automatic stop valve mechanism, and means under control of the engineer for converting the action from one of automatic stop to one of speed control.

4. In an air brake system of the mechanically actuated air valve and plunger type wherein means are provided for operating to open the air valve at each signal station and thereafter immediately close the same if the right of way is clear; the combination with the air brake valve and the train line of a minimum speed control mechanism associated with said automatic stop valve mechanism, a selective valve mechanism associated with said automatic stop valve mechanism and said plunger device, and means under control of the engineer for operating said selective valve mechanism to convert the action from an automatic stop action to a minimum speed control action.

5. In an air brake system of the mechanically actuated air valve and plunger type wherein means are provided for operating to open the air valve at each signal station and thereafter immediately close the same if the right of way is clear; the combination with the air brake valve and the train line of a minimum speed control mechanism associated with said automatic stop valve mechanism, a selective valve mechanism associated with said automatic stop valve mechanism and said plunger device, and means under control of the engineer for operating said selective valve mechanism to convert the action from an automatic stop action to a minimum speed control action, said last named means comprising an acknowledgment valve associated with said speed control mechanism, with said selective valve and with a source of pressure supply.

6. In an air brake system of the mechanically actuated air valve and plunger type wherein means are provided for operating to open the air valve at each signal station and thereafter immediately close the same if the right of way is clear; the combination with the air brake valve and the train line of a selective valve device, an acknowledgment valve and a speed controlled governor valve device, said acknowledgment valve and said speed controlled governor valve device being cooperatively connected to enable the engineer to convert an automatic stop action into a speed controlled action.

7. In an air brake system of the mechanically actuated air valve and plunger type wherein means are provided for operating to open the air valve at each signal station and thereafter immediately close the same if the right of way is clear; devices for effecting an automatic stop action at times, means under control of the engineer for converting the said automatic stop action into an action controlled by a speed-governed piston valve mechanism, and means for effecting an automatic stop at speeds above a predetermined rate.

8. In an air brake system of the mechanically actuated air valve and plunger type wherein means are provided for operating to open the air valve at each signal station and thereafter immediately close the same if the right of way is clear; devices for effecting an automatic stop action at times, means under control of the engineer for converting the automatic stop action into speed-control action, said means including a speed governor and means independent of the automatic stop devices for effecting an automatic stop at speeds above a predetermined maximum.

9. In an air brake system of the mechanically actuated air valve and plunger type wherein means are provided for operating to open the air valve at each signal station and thereafter immediately close the same if the right of way is clear, the combination with the air brake valve and the train line of a maximum speed control mechanism including a speed governor, a blanking valve device mechanism and a control valve mechanism associated with the blanking valve mechanism and the governor for controlling the position of the blanking device to effect a brake application or not accordingly as the speed of the train exceeds a predetermined maximum or not.

10. In combination with an automatic train stopping mechanism of the type wherein is provided an air valve, a main valve-operating cam shaft and a plunger mechanism operating on said shaft to open and close said air valve; a selective valve associated with said air valve, a selective valve cam associated with said plunger to be moved in one direction by the action of the plunger to set said selective valve to one position, a speed governor mechanism associated with said selective valve, and means under control of the engineer and associated with said selective valve and said governor mechanism for setting said selective valve to another position for the purposes specified.

11. In train stopping systems wherein is provided an air brake system including a train line and an engineer's valve, and an automatic stop apparatus which includes an air valve mechanism connected in the train line and which includes a plunger device to operate said valve mechanism, said valve mechanism including an escape port; a selective valve comprising a casing, a free piston therein having a spaced pair of elements, said selective valve casing having a port in communication with the air escape port of said air valve mechanism and having a port in communication with the atmosphere, manually controlled means to lead air under pressure into said selective valve casing to move said piston in one direction, means operated by said automatic stop apparatus plunger to move said selective valve piston in the opposite direction, a governor operating valve mechanism having a port in communication with said selective valve casing, another port in communication with the atmosphere, and a third port in communication with said manually controlled means, substantially as specified.

12. In an air brake system of the mechanically actuated air valve and plunger type wherein means are provided for operating to open the air valve at each signal station and thereafter immediately close the same if the right of way is clear, the combination with the air brake valve and the train line of a blanking valve, including a movable element, connected in the train line between the automatic stop valve and the engineer's valve and normally maintaining the passage therebetween clear, and speed controlled means cooperatively connected with said blanking valve to close the air connection between the engineer's valve and the blanking valve and opening the train line beyond to atmosphere on attaining a predetermined speed.

13. In an air brake system of the mechanically actuated air valve and plunger type wherein means are provided for operating to open the air valve at each signal station and thereafter immediately close the same if the right of way is clear, the combination with the air brake valve and the train line of a blanking valve, including a movable element, connected in the train line between the automatic stop valve and the engineer's valve and normally maintaining the psasage therebetween clear, and speed controlled means cooperatively connected with said blanking valve to close the air connection between the engineer's valve and the blanking valve and opening the train line beyond to atmosphere on attaining a predetermined speed, said means comprising a governor and a release valve controlled by the governor, said blanking valve having a pressure chamber connected with the said release valve, and a piston on said movable element within said pressure chamber to hold said element in one position so long as said release valve is closed.

14. A blanking valve comprising a casing having an inlet chamber, an intermediate chamber and an outlet chamber and having passages with valve seats between the inlet and intermediate chambers, and between the intermediate and outlet chambers, a piston element having two valve members cooperating respectively with said valve seats to open communication between said intermediate chamber and one or the other of said outlet and inlet chambers at times, and means adapted to be controlled for maintaining said piston element in one position at times.

15. A blanking valve comprising a casing having an inlet chamber, an intermediate chamber and an outlet chamber and having passages with valve seats between the inlet and intermediate chambers, and between the intermediate and outlet chambers, a piston element having two valve members cooperating respectively with said valve seats to open communication between said intermediate chamber and one or the other of said outlet and inlet chambers at times, said casing having a piston chamber, a piston on said piston element in said piston chamber, and means for maintaining, at times, a pressure in said piston chamber sufficient to hold said piston element over to open passage between said inlet and intermediate chambers.

16. A blanking valve comprising a casing having an inlet chamber, an intermediate chamber and an outlet chamber and having passages with valve seats between the inlet and intermediate chambers, and between the intermediate and outlet chambers, a piston element having two valve members cooperating respectively with said valve seats to open communication between said intermediate chamber and one or the other of said outlet and inlet chambers at times, said casing having a piston chamber, a piston on said piston element in said piston chamber, means for maintaining, at times, a pressure in said piston chamber sufficient to hold said piston element over to open passage between said inlet and intermediate chambers, said last named means comprising a duct between said inlet and said piston chambers, and means for releasing the pressure in said piston chamber to permit said piston element to shift.

17. In combination with an air brake system of a train, a blanking valve comprising a casing having an inlet chamber in communication with the main reservoir side of the train line, an intermediate chamber in communication with the brake side of the train line, an outlet chamber in communication with atmosphere, and a piston chamber, a duct between said inlet chamber and said piston chamber, said casing also having valve-seat passages between said intermediate chamber and each of said inlet and outlet chambers, a piston element having valve members cooperating with said seats to open communication between said intermediate chamber and one or the other of said inlet and outlet chambers alternately, said piston element projecting into said piston chamber and having a packed portion therein, all being arranged whereby pressure in said piston chamber will normally exert a greater pressure against said piston element than is exerted against the valve members thereof thereby to hold the passage between the inlet and intermediate chambers normally open.

18. In combination with an air brake system of a train, a blanking valve comprising a casing having an inlet chamber in communication with the main reservoir side of the train line, an intermediate chamber in communication with the brake side of the train line, an outlet chamber in communication with atmosphere, and a piston chamber, a duct between said inlet and said piston chamber, said casing also having valve-seat passages between said intermediate chamber and each of said inlet and outlet chambers, a piston element having valve members co-operating with said seats to open communication between said intermediate chamber and one or the other of said inlet and outlet chambers alternately, said piston element projecting into said piston chamber and having a packed portion therein, all being arranged whereby pressure in said piston chamber will normally exert a greater pressure against said piston element than is exerted against the valve members thereof thereby to hold the passage between the inlet and intermediate chambers normally open, and means to release the pressure in said piston chamber at times to permit said piston to shift.

19. In combination with an air brake system of a train, a blanking valve comprising a casing having an inlet chamber in communication with the main reservoir side of the train line, an intermediate chamber in communication with the brake side of the train line, an outlet chamber in communication with atmosphere, and a piston chamber, a duct between said inlet and said piston chamber, said casing also having valve-seat passages between said intermediate chamber and each of said inlet and outlet chambers, a piston element having valve members co-operating with said seats to open communication between said intermediate chamber and one or the other of said inlet and outlet chambers alternately, said piston element projecting into said piston chamber and having a packed portion therein, all being arranged whereby pressure in said piston chamber will normally exert a greater pressure against said piston element than is exerted against the valve members thereof thereby to hold the passage between the inlet and intermediate chambers normally open, speed controlled means to release the pressure within said piston chamber at times whereby said piston element will shift its valves to close the passage between the inlet and intermediate chambers and open the passages between the intermediate and outlet chambers.

20. In train stopping apparatus of the plunger-operated-valve-actuating-cam-shaft-type wherein is provided an air brake valve, a main cam and shaft adapted to be rocked by the plunger action to control the air brake valve; the combination with the main cam shaft and the plunger, of another cam journalled on said main cam shaft and associated with said main cam to be moved in one direction therewith by the plunger, and a cam latch associated with said another cam to hold it in either of a plurality of positions.

21. In train stopping apparatus of the plunger-operated-valve-actuating-cam-shaft-type wherein is provided an air brake valve, a main cam and shaft adapted to be rocked by the plunger action to control the air brake valve; the combination with the main cam shaft and the plunger, of another cam journalled on said main cam shaft and associated with said main cam to be moved in one direction therewith by the plunger, and a cam latch associated with said another cam to hold it in either of a plurality of positions, said another cam having a lug, and a device including a shiftable element co-operating with said lug to be shifted thereby and to shift the lug as desired.

22. In train stopping systems, having a double or right or left train stop equipment; the combination with the train line and the connections between the train line and the two train-stop equipments, of a directional valve mechanism including a pair of valve elements, a lever, a two-way cam on said lever adapted to operate on said valve elements alternately to open the same accordingly as said lever is in one position or the other.

23. In an air brake system of the mechanically actuated air valve and plunger type wherein means are provided for operating to open the air valve at each signal station and thereafter immediately close the same if the right of way is clear; the combination with the air brake valve and the train line of a blanking valve including a movable element connected in the train line and normally maintaining the passage therethrough clear, and speed controlled means operatively connected with said blanking valve to close the air connection between the engineer's valve and the blanking valve and open the train line beyond to atmosphere on attaining the predetermined speed.

24. In an air brake system of the mechanically actuated air valve and plunger type wherein means are provided for operating to open the air valve at each signal station and thereafter immediately close the same if the right of way is clear, the combination with the air brake valve and the train line of a blanking valve including a movable element connected in the train line and normally maintaining the passage therethrough clear, and speed controlled means operatively connected with said blanking valve to close the air connection between the engineer's valve and the blanking valve and open the train line beyond to atmosphere on attaining the predetermined speed, said means comprising a speed governor, a release valve controlled by the governor, and operable connections between the release valve and the blanking valve.

25. In an air brake system of the mechanically actuated air valve and plunger type wherein means are provided for operating to open the air valve at each signal station and thereafter immediately close the same if the right of way is clear, the combination with the air brake valve and the train line of a blanking valve, including a movable element, connected in the train line below the engineer's valve and normally maintaining the passage therebetween clear, and speed controlled means cooperatively connected with said blanking valve to close the air connection between the engineer's valve and the blanking valve and open the train line beyond to atmosphere on attaining a predetermined speed.

26. In train stopping apparatus of the plunger-operated-valve-actuating-cam-shaft type wherein is provided an air brake valve connected in the train line, and plunger mechanism ramp operated to actuate said air brake valve; devices for effecting an automatic stop action at times, means under control of the engineer for converting the said automatic stop action into an action controlled by a speed governed piston valve mechanism.

27. In train stopping apparatus of the plunger-operated-valve-actuating-cam-shaft type wherein is provided an air brake valve, a main cam and shaft adapted to be rocked by the plunger action to control the air brake valve; the combination with the main cam shaft and the plunger, of another cam journalled on said main cam shaft and associated with said main cam to be moved in one direction therewith by the plunger.

28. In train stopping apparatus of the plunger-operated-valve-actuating-cam-shaft type wherein is provided an air brake valve, a main cam and shaft adapted to be rocked by the plunger action to control the air brake valve; the combination with the main cam shaft and the plunger, of another cam journalled on said main cam shaft and associated with said main cam to be moved in one direction therewith by the plunger, said another cam having a lug, and a device including a shiftable element cooperating with said lug to be shifted thereby and to shift the lug as desired.

JEAN F. WEBB, Jr.